( 12 ) United States Patent
Watanabe et al.

(10) Patent No.: US 12,468,406 B2
(45) Date of Patent: Nov. 11, 2025

(54) INPUT SYSTEM AND INPUT METHOD FOR SETTING INSTRUCTION TARGET AREA INCLUDING REFERENCE POSITION OF INSTRUCTION DEVICE

(71) Applicant: Wacom Co., Ltd., Saitama (JP)

(72) Inventors: Naoki Watanabe, Saitama (JP); Tatsunori Kato, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/645,275

(22) Filed: Apr. 24, 2024

(65) Prior Publication Data

US 2024/0272731 A1 Aug. 15, 2024

Related U.S. Application Data

(63) Continuation of application No. 18/162,441, filed on Jan. 31, 2023, now Pat. No. 11,995,252, which is a (Continued)

(30) Foreign Application Priority Data

Aug. 25, 2020 (JP) ................. 2020-141485

(51) Int. Cl.
*G06F 3/0354* (2013.01)
*G06F 3/01* (2006.01)
(Continued)

(52) U.S. Cl.
CPC .......... *G06F 3/03545* (2013.01); *G06F 3/013* (2013.01); *G06F 3/0346* (2013.01);
(Continued)

(58) Field of Classification Search
CPC ........ G06F 3/011; G06F 3/013; G06F 3/0346; G06F 3/03545; G06F 3/04162; G06F 3/044; G06F 3/04815; G06V 20/20; G06V 30/32

See application file for complete search history.

(56) References Cited

U.S. PATENT DOCUMENTS 11,586,300 B2    2/2023  Watanabe et al.
2011/0032274 A1  2/2011  Miyata
(Continued)

FOREIGN PATENT DOCUMENTS

JP    2013125487 A    6/2013
WO    2019102825 A1   5/2019

*Primary Examiner* — Chun-Nan Lin
(74) *Attorney, Agent, or Firm* — Seed Intellectual Property Law Group LLP

(57) ABSTRACT

Provided is an input system including an instruction device; a detection device that detects an instruction position of the instruction device; a display device that is provided separately from the detection device and that displays an image of a space; a position detector that detects, in the space, a line-of-sight position in a line-of-sight of the position detector; a processor; and a memory storing instructions, which when executed by the processor, cause the processor to set, in the space, an instruction target area including a reference position of the instruction device, based on the line-of-sight position detected by the position detector at the time of reception of a predetermined operation by the instruction device, and control the display device to display the instruction position of the instruction device in the instruction target area and on the image of the space.

12 Claims, 8 Drawing Sheets

Related U.S. Application Data continuation of application No. 17/399,736, filed on Aug. 11, 2021, now Pat. No. 11,586,300.

(51) Int. Cl.
  *G06F 3/0346* (2013.01)
  *G06F 3/041* (2006.01)
  *G06F 3/04815* (2022.01)
  *G06F 3/044* (2006.01)

(52) U.S. Cl.
  CPC ...... *G06F 3/04162* (2019.05); *G06F 3/04815* (2013.01); *G06F 3/044* (2013.01)

(56) References Cited

U.S. PATENT DOCUMENTS

| | | |
|---|---|---|
| 2016/0371886 A1 | 12/2016 | Thompson et al. |
| 2018/0025248 A1 | 1/2018 | Shan et al. |
| 2018/0025531 A1 | 1/2018 | Terahata |
| 2019/0034056 A1* | 1/2019 | Eisenmann ............. G06T 19/20 |
| 2020/0279279 A1 | 9/2020 | Chaudhuri |
| 2021/0181854 A1 | 6/2021 | Nakagawa et al. |
| 2021/0208675 A1 | 7/2021 | Qin et al. |
| 2021/0281733 A1 | 9/2021 | Yamanaka |
| 2021/0349529 A1 | 11/2021 | Winold et al. |
| 2022/0066456 A1* | 3/2022 | Ebrahimi Afrouzi ........................ G06F 3/04883 |
| 2022/0139084 A1* | 5/2022 | Mandelli ................... G01S 5/16 382/103 |
| 2022/0206986 A1* | 6/2022 | Vega Galvez ......... A61B 5/682 |

\* cited by examiner

| OBJECT ID | OCCUPIED REGION | BASE VECTORS | REFERENCE COORDINATES |
|---|---|---|---|
| OB001 | Reg1 | (Ex1, Ey1, Ez1) | (Xv1, Yv1, Zv1) |
| OB002 | Reg2 | (Ex2, Ey2, Ez2) | (Xv2, Yv2, Zv2) |
| OB003 | Reg3 | (Ex3, Ey3, Ez3) | (Xv3, Yv3, Zv3) |
| ... | ... | ... | ... |

PEN-UP OPERATION

INPUT SYSTEM AND INPUT METHOD FOR SETTING INSTRUCTION TARGET AREA INCLUDING REFERENCE POSITION OF INSTRUCTION DEVICE

BACKGROUND

Technical Field

The present disclosure relates to an input system and an input method.

Background Art

There is a conventionally known digital ink system that can input ink data describing a set of strokes, through a writing operation of an instruction device including a stylus. There may be a case in which, for example, written content is displayed on a section different from a writing section, according to a writing operation of a user.

In a technique disclosed in Japanese Patent Laid-Open No. 2013-125487, a two-dimensional virtual plane is set on a three-dimensional space, and then a stroke written on the virtual plane is immediately displayed on a display apparatus that a user can wear.

A virtual space including various objects can be displayed, and the user can simulate an experience of leaving writing in the space. However, the virtual plane is set and then fixed as it is in the technique disclosed in Japanese Patent Laid-Open No. 2013-125487. The written content is thus sometimes displayed on a section different from that intended by the user, posing a problem that the input operability of the user is lost.

BRIEF SUMMARY

The present disclosure has been made in view of the problem, and an object of the present disclosure is to provide an input system and an input method that can improve input operability of a user in an apparatus configuration in which a detection device that detects an instruction position of an instruction device and a display device that displays an image of a space are separately provided.

A first aspect of the present disclosure provides an input system including an instruction device; a detection device which, in operation, detects an instruction position of the instruction device; a display device provided separately from the detection device, wherein the display device, in operation, displays an image of a space; a position detector which, in operation, detects, in the space, a line-of-sight position in a line-of-sight of the position detector; a processor; and a memory storing instructions, which when executed by the processor, cause the processor to set, in the space, an instruction target area including a reference position of the instruction device, based on the line-of-sight position detected by the position detector at the time of reception of a predetermined operation by the instruction device, and control the display device to display the instruction position of the instruction device in the instruction target area and on the image of the space.

A second aspect of the present disclosure provides an input method in an input system including an instruction device; a detection device that detects an instruction position of the instruction device; a display device provided separately from the detection device and that displays an image of a space; and a position detector which, in operation, detects, in the space, a line-of-sight position in line-of-sight of the position detector, the input method including setting, by one or more processors, in the space, an instruction target area including a reference position of the instruction device, based on the line-of-sight position detected by the position detector at the time of reception of a predetermined operation by the instruction device; and controlling, by the one or more processors, the display device to display the instruction position of the instruction device in the instruction target area and on the image of the space.

According to the present disclosure, the input operability of the user is further improved in the apparatus configuration in which the detection device that detects the instruction position of the instruction device and the display device that displays the image of the space are separately provided.

DETAILED DESCRIPTION

Figure 1:
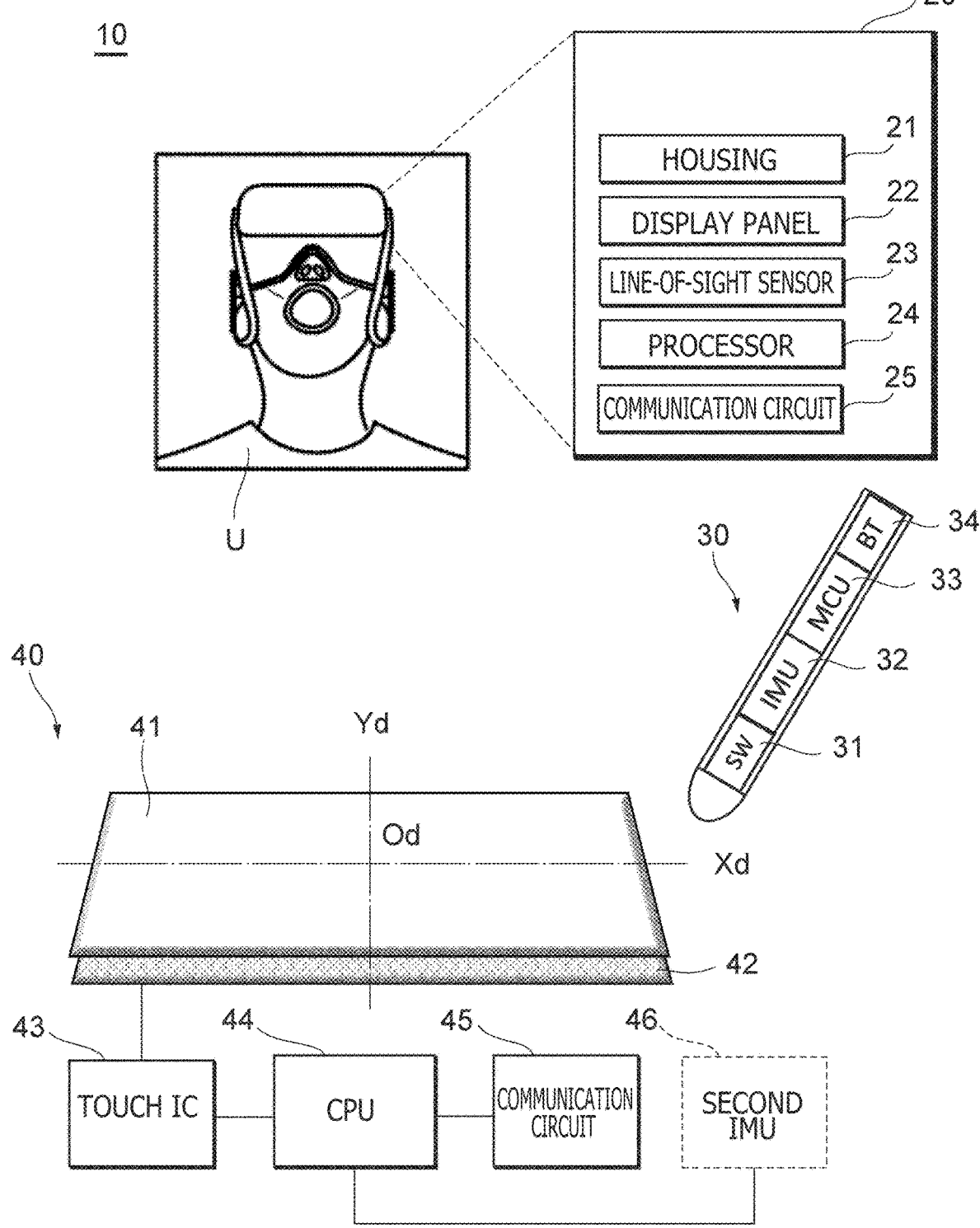
FIG. 1 is an overall configuration diagram of an input system according to an embodiment of the present disclosure.

An embodiment of the present disclosure will now be described with reference to the attached drawings. To facilitate the understanding of the description, the same reference signs are provided as much as possible to the same constituent elements in the drawings, and the description may not be repeated.

[Configuration of Input System 10]

FIG. 1 is an overall configuration diagram of an input system 10 according to an embodiment of the present disclosure. The input system 10 is a "digital ink system" that can input ink data describing a set of strokes, through a writing operation using an instruction device. Specifically, the input system 10 includes a wearable device 20 as a mode of a display device, a stylus 30 as a mode of an instruction device, and a tablet 40 as a mode of a detection device.

The wearable device 20 is a portable display apparatus that a user U can wear. Specifically, the wearable device 20 includes a housing 21, a display panel 22 (corresponding to a "display device"), a line-of-sight sensor 23 (corresponding to a "position detector"), a processor 24 (corresponding to a "processor"), and a communication circuit 25.

The housing 21 includes a frame for holding electronic parts and a fixation member for fixing the frame to the head of the user U. The display panel 22 can display an image or video, and the display panel 22 can be, for example, a liquid crystal panel, an organic electro-luminescence (EL) panel, or electronic paper. The line-of-sight sensor 23 includes, for example, an infrared sensor, and detects the physical quantity (for example, eye movement) correlated with the line of sight of the user U.

The processor 24 includes arithmetic processing units including a central processing unit (CPU), a micro-processing unit (MPU), and a graphics processing unit (GPU). The processor 24 reads and executes programs stored in an unillustrated memory to control the display of an image, execute various calculations necessary for controlling the display, and control the transmission and reception of data.

The communication circuit 25 includes a communication interface which, in operation, transmits electrical signals to and receives electrical signals from an external apparatus. This allows the wearable device 20 to exchange various kinds of data to and from the stylus 30 or the tablet 40.

The stylus 30 is an electronic pen that can perform one-way or two-way communication with the tablet 40. The system of the electronic pen may be either one of an electromagnetic resonance (EMR) system and an active electrostatic (AES) system. For example, in a case of the AES system, the stylus 30 includes a pen pressure sensor 31, an inertial measurement unit (hereinafter, "first IMU 32"), a micro control unit (hereinafter, "MCU 33"), and a communication circuit 34.

The pen pressure sensor 31 is, for example, a pressure sensor with a variable capacitor that detects a change in capacitance generated by press of a pen tip. The pen pressure sensor 31 can detect not only the pen pressure, but also a pen event including pen-down or pen-up of the stylus 30.

The first IMU 32 is, for example, a measurement circuit including a combination of a three-axis gyro sensor and a three-direction acceleration sensor. Thus, the first IMIU 32 can measure the state of the apparatus on a pen coordinate system 60 described later (see FIGS. 6 and 8) or the state quantity indicating the time variation of the state. The state quantity includes various physical quantities, such as position, velocity, acceleration, jerk, angle, and angular velocity, used for specifying the position and the posture.

The MCU 33 is a control unit including a processor that can control the action of the stylus 30. For example, the MCU 33 performs various operations related to the calculation of the instruction position of the stylus 30 and also controls the transmission and reception of data including results of the operations. In one or more embodiments, the MCU 33 include a processor and a memory storing instructions that, when executed by the processor, causes the MCU 33 to perform the operations described herein.

The communication circuit 34 is an integrated circuit which, in operation, performs wireless communication with external apparatuses according to various communication standards including Bluetooth (registered trademark). Thus, the stylus 30 can exchange various kinds of data with the wearable device 20 or the tablet 40 through the communication circuit 34.

The tablet 40 is an apparatus that can detect the instruction position of the stylus 30, and the tablet 40 may or may not have a display function. Various detection devices including a smartphone and a personal computer may be used in place of the tablet 40. The user U can hold the stylus 30 with one hand and move the stylus 30 while pressing the pen tip against a touch surface 41 of the tablet 40, to write pictures or letters on the display surface of the wearable device 20.

The tablet 40 includes sensor electrodes 42, a touch integrated circuit (IC) 43, a CPU 44, a communication circuit 45, and a second IMU 46. The second IMU 46 may not be included if not necessary.

The sensor electrodes 42 are a set of electrodes that can detect a change in capacitance generated by approach or contact of a conductor. The detection system of the capacitance may be either one of the mutual-capacitance system and the self-capacitance system. For example, in a case of the mutual-capacitance system, the sensor electrodes 42 include a plurality of X line electrodes for detecting an Xd-axis position of a detection coordinate system 80 (see FIG. 8) and a plurality of Y line electrodes for detecting a Yd-axis position.

The touch IC 43 is an integrated circuit that drives and controls the sensor electrodes 42. The touch IC 43 drives the sensor electrodes 42, based on a control signal supplied from the CPU 44. In this way, the touch IC 43 performs a "pen detection function" of detecting the state of the stylus 30 or a "touch detection function" of detecting a touch of a finger of the user U or the like.

The CPU 44 can read and execute programs stored in an unillustrated memory to execute various functions including, for example, generation of ink data and control of transmission and reception of data. Note that various arithmetic processing units including an MPU and a GPU may be used in place of the CPU 44.

The communication circuit 45 is an integrated circuit which, in operation, performs wireless communication with external apparatuses, according to various communication standards including Bluetooth (registered trademark), similarly to the communication circuit 34. Thus, the tablet 40 can exchange various kinds of data with the wearable device 20 or the stylus 30 through the communication circuit 45.

The second IMU 46 is, for example, a measurement unit including a combination of a three-axis gyro sensor and a three-direction acceleration sensor, similarly to the first IMU 32. Thus, the second IMU 46 can measure the state quantity related to the position and the posture of the apparatus on the detection coordinate system 80 described later (see FIG. 8).

[Action of Input System 10]

The input system 10 according to the present embodiment is configured in this way. Next, an input action of the input system 10 will be described with reference to a flow chart of FIG. 2 and with reference to FIGS. 3 to 7.

<Basic Action>

Figure 2:
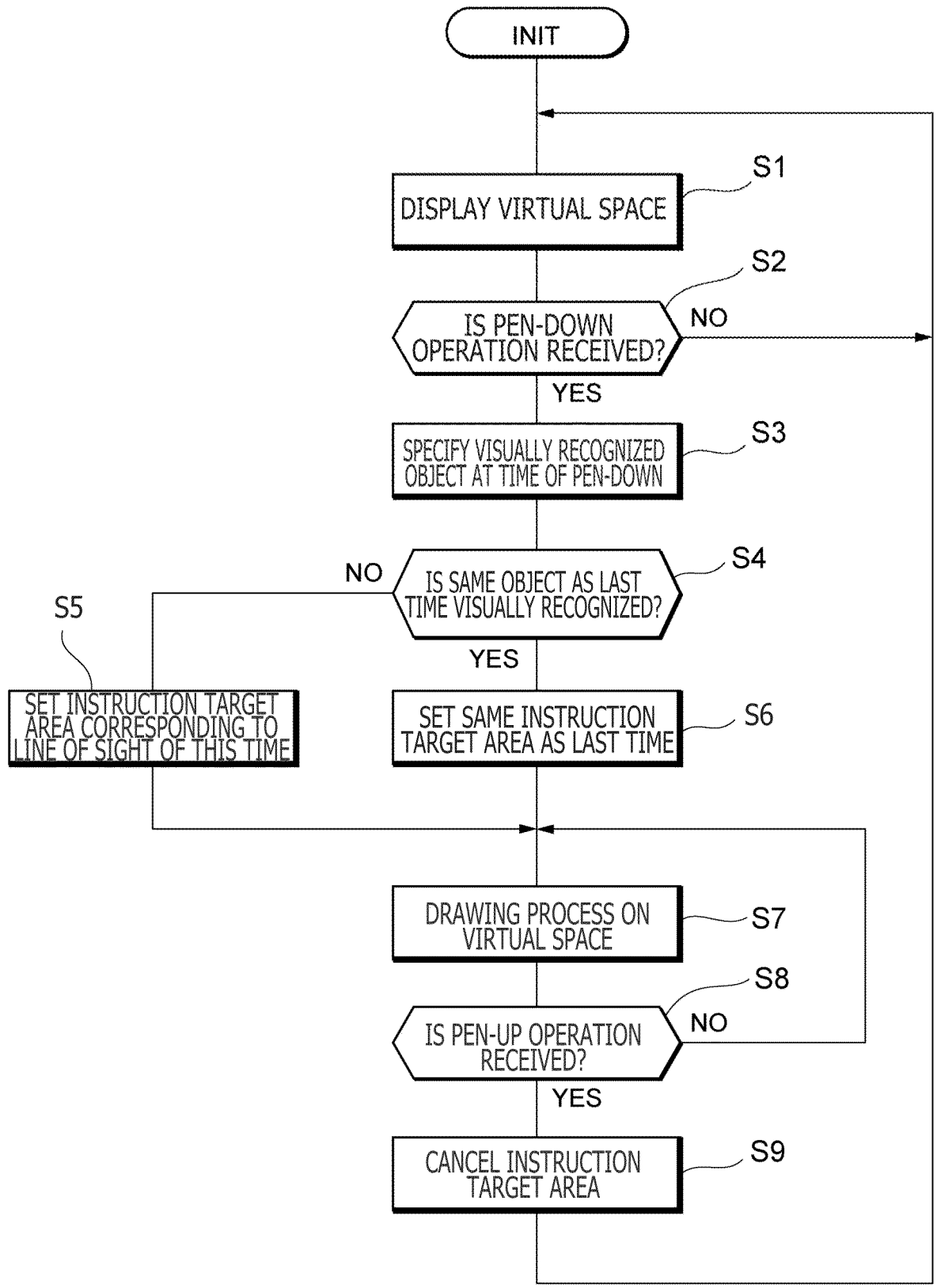
FIG. 2 is a flow chart related to an input action of the input system illustrated in FIG. 1.

At S1 of FIG. 2, the input system 10 displays a virtual space 50 in a mode that allows visual recognition by the user U. Specifically, the processor 24 of the wearable device 20 controls the display of the display panel 22 to display an image or video representing the virtual space 50.

Figures 3, 4:
FIG. 3 depicts an example of a virtual space displayed on a wearable device.
FIG. 4 depicts an example of a data structure of an area definition table.

FIG. 3 depicts an example of the virtual space 50 displayed on the wearable device 20. The virtual space 50 three-dimensionally represents a virtual room. Various objects are provided in the room including structures, such as a ceiling, a floor, walls, and a closet, and furniture, such as a bed, a table, and a chair.

At S2 of FIG. 2, the input system 10 checks whether or not a pen-down operation of the stylus 30 is received. Specifically, the MCU 33 of the stylus 30 determines whether or not the pen pressure state has changed from "OFF" to "ON," based on a detection signal of the pen pressure sensor 31. If the pen-down operation is not detected (S2: NO), the input system 10 stays at S1 until the operation is detected. On the other hand, if the pen-down operation is detected (S2: YES), the input system 10 proceeds to S3. Note that the wearable device 20 may directly acquire the detection result of the stylus 30 or may indirectly acquire the detection result through the tablet 40.

At S3, the input system 10 specifies objects (hereinafter, "virtually recognized objects") visually recognized by the user U at the time of the pen-down operation detected at S2. The processor 24 of the wearable device 20 first detects a line-of-sight position 52 (see FIG. 5) in a line-of-sight of the line-of-sight sensor 23 worn by the user U, based on a detection signal of the line-of-sight sensor 23, and then specifies objects in the virtual space 50 that are on the line of sight. In specifying the visually recognized objects, the processor 24 may refer to an area definition table illustrated in FIG. 4, for example.

FIG. 4 depicts an example of a data structure of the area definition table related to the virtual space 50 of FIG. 3. The area definition table includes data in a table format indicating a correspondence between [1] "object identification (ID)" that is identification information of the object in the virtual space 50, [2] "occupied region" occupied by the object, [3] "base vectors" of the coordinate system of the object surface, and [4] "reference coordinates" indicating the origin of the coordinate system.

The processor 24 first detects the line-of-sight position 52 in the line-of-sight of the line-of-sight sensor 23 worn by the user U, based on the detection signal of the line-of-sight sensor 23, and calculates a line-of-sight vector on the virtual space 50. The processor 24 then refers to the area definition table illustrated in FIG. 4, to determine whether or not the line-of-sight vector intersects the occupied region associated with each object. When there is a corresponding object, the object is specified as a "visually recognized object." Although an ID is allocated to each object in the example of FIG. 4, an ID may be allocated to each surface of an object with a plurality of surfaces.

At S4 of FIG. 2, the input system 10 (more specifically, the processor 24) determines whether or not the visually recognized object specified at S3 is the same as the visually recognized object specified last time. If the visually recognized object is the same as the visually recognized object specified last time (S4: YES), the input system 10 proceeds to S5. On the other hand, if the visually recognized object is different from the visually recognized object specified last time (S4: NO), the input system 10 proceeds to S6.

Figure 6:
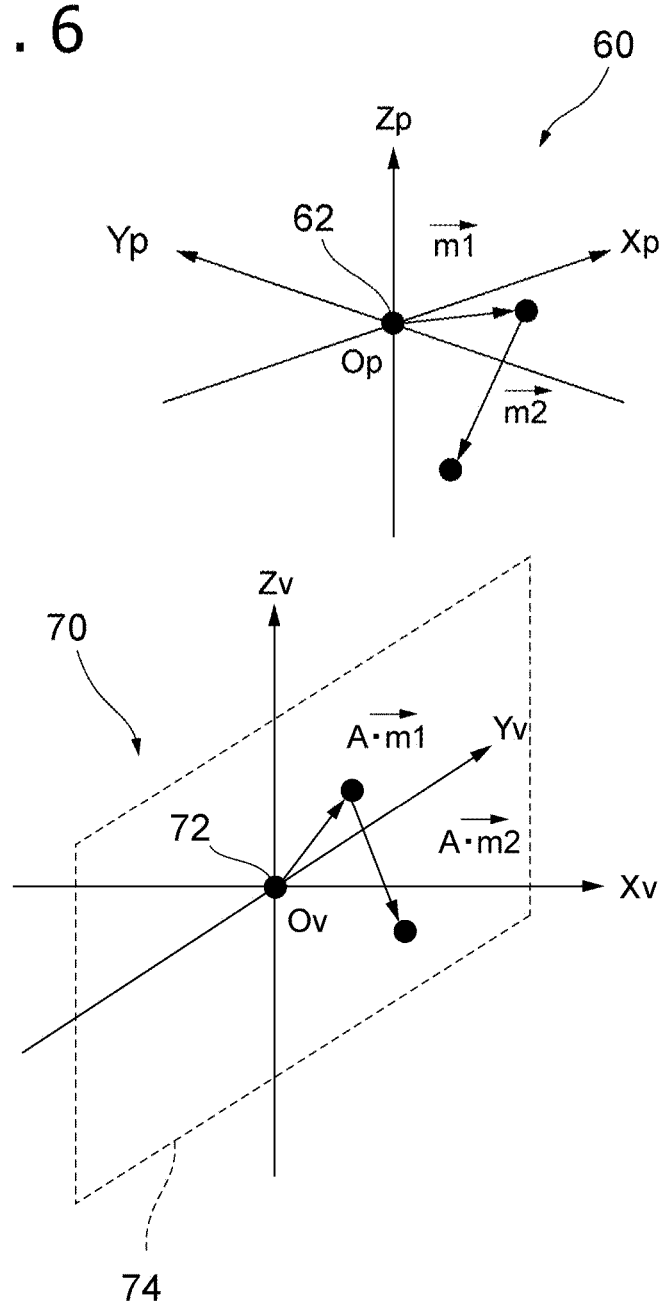
FIG. 6 depicts a correspondence between a pen coordinate system and a virtual coordinate system.

In the case where the input system 10 (more specifically, the processor 24) proceeds to S5, the input system 10 sets an instruction target area 74 (FIG. 6) corresponding to the visually recognized object specified at S3, that is, the line of sight of this time. Specifically, the processor 24 refers to the area definition table of FIG. 4 and sets a planar instruction target area 74 in a virtual coordinate system 70 (FIG. 6). For example, in a case where the ID of the visually recognized object is OB0001, the processor 24 sets a reference position 72 (FIG. 6) with coordinate values (Xv1, Yv1, Zv1), as a "center point" of the instruction target area 74, sets two base vectors (Ex1↑, Ey1↑) as "plane vectors" of the instruction target area 74, and sets the remaining base vector Ez1↑ as a "normal vector" of the instruction target area 74.

In the case where the input system 10 (more specifically, the processor 24) proceeds to S6, the input system 10 sets the same instruction target area 74 as at S5 or S6 at the time of the latest execution of the flow chart, that is, the same instruction target area 74 as the last time. In addition, the processor 24 displays the virtual space 50 after switching the point of view so that the instruction target area 74 comes to the front of a display area displayed the display device.

Figure 5:
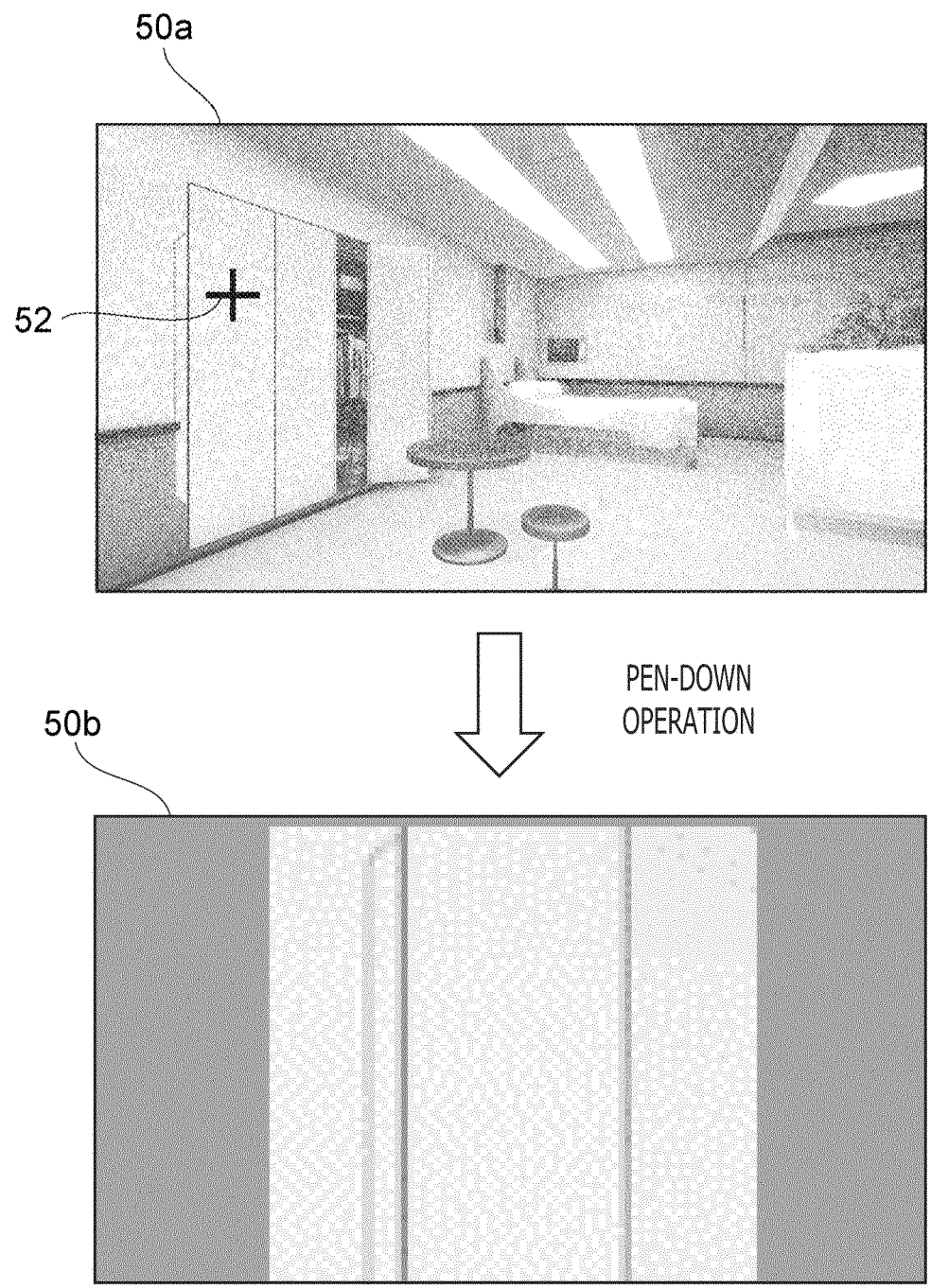
FIG. 5 depicts a transition of a three-dimensional (3D) image over a period from before to after a pen-down operation.

FIG. 5 depicts a transition from a 3D image 50a to a 3D image 50b over a period from before to after the pen-down operation. More specifically, an upper drawing illustrates the 3D image 50a obtained before the pen-down operation, and a lower drawing illustrates the 3D image 50b obtained after the pen-down operation. For example, the 3D image 50a is switched to the 3D image 50b when the pen-down operation is performed with the line-of-sight position 52 in the line-of-sight of the line-of-sight sensor 23 worn by the user U at the door of the closet. The 3D image 50b corresponds to a two-dimensional image in which the point of view is switched so that the door of the closet (that is, the instruction target area 74) comes to the front.

At S7 of FIG. 2, the input system 10 performs a drawing process on the virtual space 50, according to a pen move operation of the user U. The stylus 30 first sets the position of the apparatus at the time of the pen-down operation to an origin Op of the pen coordinate system 60 and then sequentially acquires the state quantity measured by the first IMU 32. Then, the wearable device 20 directly acquires data including the state quantity from the stylus 30. Alternatively, the wearable device 20 may indirectly acquire the data from the stylus 30 through the tablet 40.

The processor 24 then converts the state quantity of the stylus 30 according to a predetermined conversion rule and sequentially adds the state quantity obtained after the conversion, to thereby calculate the instruction position on the virtual space 50. Hereinafter, a time series of the amount of movement will be used to describe an example of calculating the instruction position on the virtual coordinate system 70, with reference to FIG. 6.

The pen coordinate system 60 on the upper side of FIG. 6 is a three-dimensional Cartesian coordinate system including an Xp-axis, a Yp-axis, and a Zp-axis and is uniquely defined by the stylus 30. For example, when a pen-down position 62 of the stylus 30 is the origin Op, $m\uparrow(t)$ represents the amount of movement (three-dimensional vector) of the stylus 30 on the pen coordinate system 60 at t-th time.

On the other hand, the virtual coordinate system 70 on the lower side of FIG. 6 is a three-dimensional Cartesian coordinate system including an Xv-axis, a Yv-axis, and a Zv-axis and is uniquely defined by the wearable device 20. Here, a rectangular area indicated by a dashed line corresponds to the instruction target area 74 set based on the reference position 72. Pv(t) is sequentially calculated according to $Pv(t)=Pv(t-1)+A\cdot m\uparrow(t)$ where Pv(t) represents the instruction position on the virtual coordinate system 70 at t-th time.

Here, A corresponds to an affine matrix (three rows×three columns) for converting the pen coordinate system 60 into the virtual coordinate system 70. The affine matrix A is uniquely defined if the pen coordinate system 60 and the virtual coordinate system 70 are known. For example, the affine matrix A may be stored in advance in association with the object or the object surface or may be calculated every time the instruction target area 74 is set.

Then, the processor 24 controls the display panel 22 to superimpose a mark on the calculated instruction position in the currently displayed virtual space 50. This action is sequentially performed to superimpose a trajectory (that is, a stroke) of marks, such as dots, on the virtual space 50.

At S8 of FIG. 2, the input system 10 checks whether or not a pen-up operation is detected. Specifically, the MCU 33 of the stylus 30 determines whether or not the pen pressure state has changed from "ON" to "OFF," based on the detection signal of the pen pressure sensor 31. If the pen-up operation is not detected (S8: NO), the input system 10 sequentially repeats S7 and S8 until the operation is detected. On the other hand, if the pen-up operation is detected (S8: YES), the input system 10 proceeds to S9.

At S9, the input system 10 (more specifically, the processor 24) cancels the instruction target area 74 set at S5 and S6. In addition, the processor 24 displays the virtual space 50 in which the previous point of view is restored.

Figure 7:
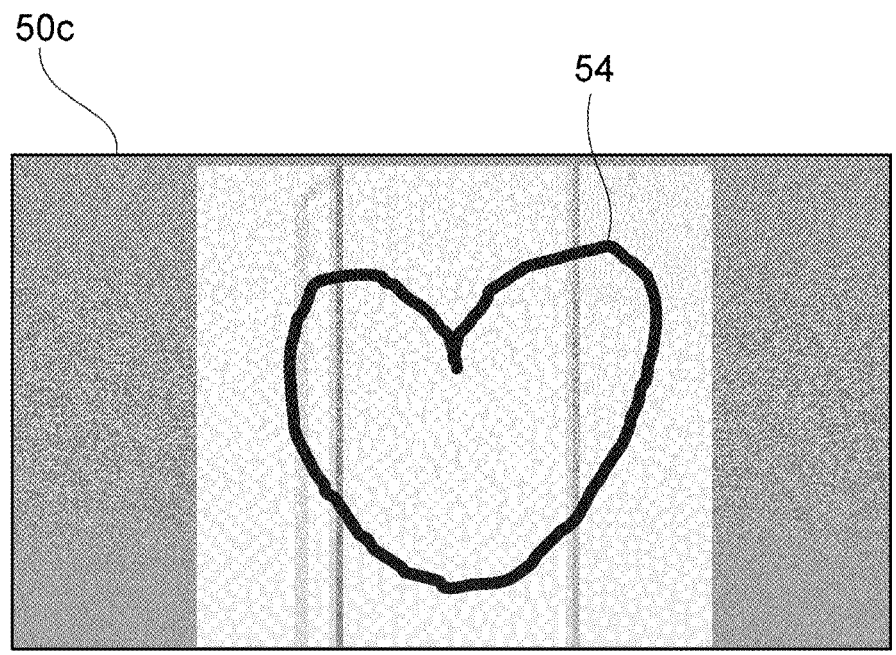
FIG. 7 depicts a transition of a 3D image over a period from before to after a pen-up operation.
Figure 7:
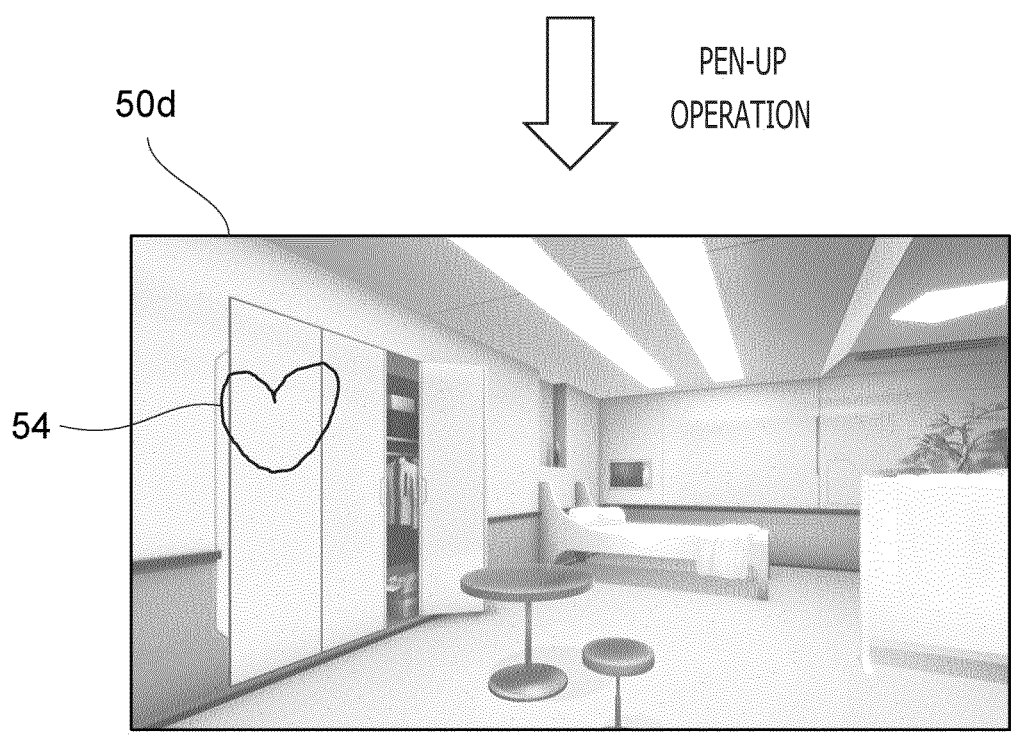

FIG. 7 depicts a transition from a 3D image 50c to a 3D image 50d over a period from before to after the pen-up operation. More specifically, an upper drawing illustrates the 3D image 50c obtained before the pen-up operation, and a lower drawing illustrates the 3D image 50d obtained after the pen-up operation. For example, the 3D image 50c is switched to the 3D image 50d when the pen-up operation is performed after one stroke is finished. The 3D image 50d corresponds to an image in which one stroke is written on the 3D image 50a of FIG. 5.

Subsequently, the input system 10 returns to S1 and sequentially performs one of S1 to S9. In this way, the action of the input system 10 is continued, and the user U can simulate an experience of leaving the writing in the virtual space 50.

<Advantageous Effects of Basic Action>

As described above, the input system 10 according to the embodiment includes the stylus 30; the tablet 40 that detects the instruction position of the stylus 30; the display panel 22 provided separately from the tablet 40 and configured to display the image of the space (here, the virtual space 50); the line-of-sight sensor 23 that detects, in the virtual space 50, the line-of-sight position 52 in the line-of-sight of the line-of-sight sensor 23 worn by the user U; and one or a plurality of processors (here, the processor 24). The processor 24 sets, in the virtual space 50, the instruction target area 74 including the reference position 72 of the stylus 30, based on the line-of-sight position 52 detected by the line-of-sight sensor 23 at the time of the reception of a predetermined operation by the stylus 30 (S5 and S6 of FIG. 2), and controls the display panel 22 to display the instruction position of the stylus 30 in the instruction target area 74 and on the virtual space 50 (S7 of FIG. 2).

In this way, the instruction target area 74 including the reference position 72 of the stylus 30 is set in the virtual space 50, based on the detected line-of-sight position 52, and thus, the instruction position can be displayed on the line of sight of the user U at the moment, that is, at a section closer to that intended by the user U who is about to perform writing. This further increases the input operability of the user U in an apparatus configuration in which the tablet 40 that detects the instruction position of the stylus 30 and the display panel 22 that displays the virtual space 50 are separately provided.

Particularly, when the specific operation is the "pen-down operation" for pressing the pen tip of the stylus 30 against the touch surface 41, the user U can perform the operation with a feeling of performing a normal writing operation, and a special operation is not necessary. This further improves the usability of the user U.

In addition, the instruction target area 74 may be set for each object in the virtual space 50 or for each object surface. Thus, the user U can feel as if the user U selects an object in the virtual space 50 to leave writing, and this increases the sense of reality of the simulated experience.

In addition, when the line-of-sight position 52 of last time and the line-of-sight position 52 of this time are on the same object or on the same object surface, the processor 24 may set the same reference position 72 and the same instruction target area 74 as those set last time. This facilitates reflection of the intention of the user U trying to continue writing on the same object or on the same object surface.

Conversely, when the line-of-sight position 52 of last time and the line-of-sight position 52 of this time are on different objects or on different object surfaces, the processor 24 may set a reference position 72 and an instruction target area 74 different from those set last time. This facilitates reflection of the intention of the user U changing the object or the object surface of interest.

In addition, when the instruction target area 74 is set, the processor 24 may display the virtual space 50 after switching the point of view so that the instruction target area 74 comes to the front. This facilitates the writing operation of the user U.

In addition, the stylus 30 or the tablet 40 may sequentially output the amount of movement of the stylus 30 from the moment of the reception of a predetermined operation. The processor 24 may convert the amount of movement of the stylus 30 according to a predetermined conversion rule and sequentially add the amount of movement obtained after the conversion to the coordinate values of the reference position 72 to thereby calculate the instruction position on the virtual space 50. The processor 24 calculates the instruction position on the virtual space 50, and this configuration reduces the load of arithmetic processing of the stylus 30.

[Correction of State of Stylus 30]

<Problem of Basic Action>

In the basic action described above, the tablet 40 is arranged in a horizontal state, and the tablet 40 is not moved. However, the writing may not properly be displayed on the virtual space 50 when the position and the posture of the tablet 40 are changed with time.

Figure 8:
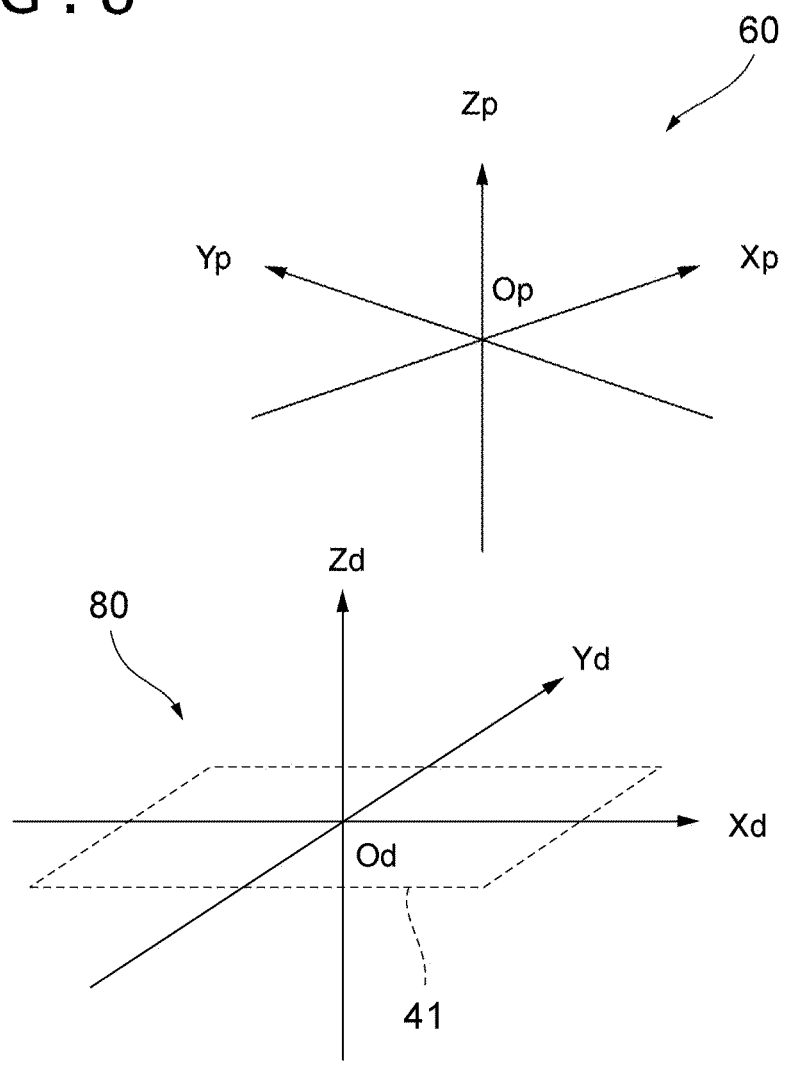
FIG. 8 depicts a correspondence between the pen coordinate system and a detection coordinate system.

FIG. 8 depicts a correspondence between the pen coordinate system 60 and the detection coordinate system 80. The pen coordinate system 60 on the upper side of FIG. 8 is a three-dimensional Cartesian coordinate system including an Xp-axis, a Yp-axis, and a Zp-axis and is uniquely defined by the stylus 30. On the other hand, the detection coordinate system 80 on the lower side of FIG. 8 is a three-dimensional Cartesian coordinate system including an Xd-axis, a Yd-axis, and a Zd-axis and is uniquely defined by the tablet 40. Here, a rectangular area indicated by a dashed line corresponds to an area formed by the touch surface 41.

An Xp-Yp plane is parallel to an Xd-Yd plane when the tablet 40 is arranged in an ideal state (for example, a horizontal state). That is, the stylus 30 is moved in the horizontal direction while the user U performs writing (pen move operation). However, when the tablet 40 is inclined with respect to the horizontal plane, the stylus 30 is moved along the inclined touch surface 41 (Xd-Yd plane) while the user U performs writing. That is, there is a deviation from the ideal arrangement state, and the affine transformation process executed by the wearable device 20 does not conform to the actual behavior. Therefore, the state quantity of the tablet 40 can be used to correct the state quantity of the stylus 30 and thereby solve the problem.

<Description of Correction Action>

Figure 9:
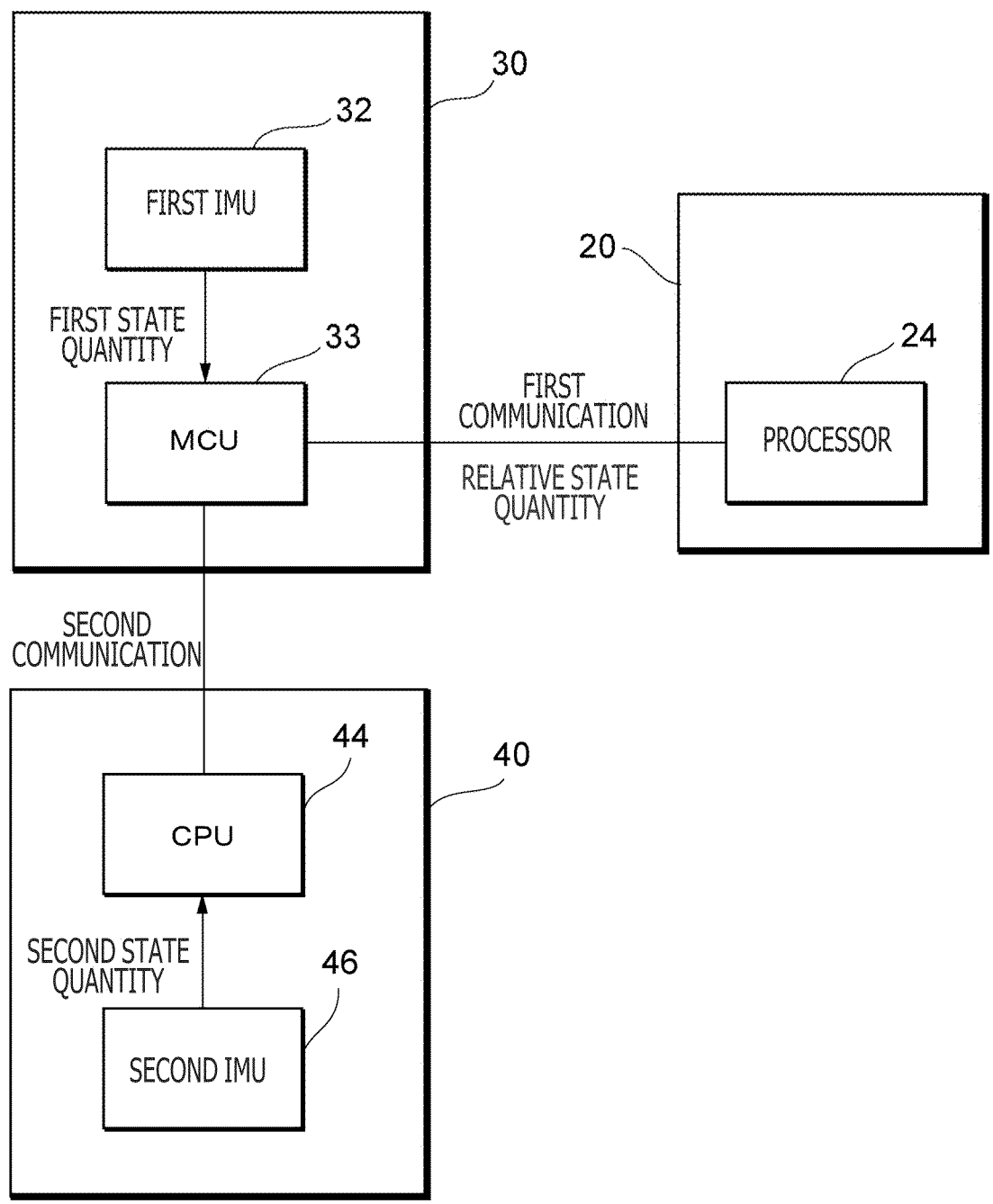
FIG. 9 is a schematic diagram related to a correction action in which a state quantity of a tablet is taken into account.

FIG. 9 is a schematic diagram related to a correction action in which the state of the tablet 40 is taken into account. Only the main components of the wearable device 20, the stylus 30, and the tablet 40 are depicted. Hereinafter, the state quantity of the apparatus measured by the stylus 30 using the first IMU 32 will be referred to as a "first state quantity," and the state quantity of the apparatus measured by the tablet 40 using the second IMU 46 will be referred to as a "second state quantity."

The MCU 33 of the stylus 30 sequentially acquires the first state quantity measured by the first IMU 32 at a first cycle T1. The MCU 33 then performs control of integrating the first state quantity with the most recently acquired second state quantity and transmitting data (hereinafter, "first data") including the detection result of the pen pressure of the pen pressure sensor 31 and the integrated state quantity to the wearable device 20. The "integration" here denotes acquisition of a relative state quantity by subtracting the second state quantity from the first state quantity or linkage of the first state quantity and the second state quantity. Hereinafter, the communication between the stylus 30 and the wearable device 20 will be referred to as "first communication."

Meanwhile, the MCU 33 of the stylus 30 performs control of receiving data (hereinafter, referred to as "second data") including the second state quantity from the tablet 40. The second state quantity is sequentially measured by the second IMU 46 of the tablet 40 at a second cycle T2. Hereinafter, the communication between the stylus 30 and the tablet 40 will be referred to as "second communication." A relay communication function provided according to a communication standard, such as Bluetooth (registered trademark), is used to transmit and receive the second state quantity.

The stylus 30 on the writing side is frequently moved by the user U, and the time variation of the state is thus relatively large. On the other hand, the tablet 40 on the written side is hardly moved by the user U, and the time variation of the state is thus relatively small. That is, the advantageous effect of the correction can sufficiently be obtained even if the update frequency of the second state quantity is low. Thus, the execution frequency of the second communication can relatively be lower than the execution frequency of the first communication. This can reduce the number of times of communication, and as a result, the power consumption can be saved.

Specifically, the number of times of communication per unit time may be set to N:1 (N is an integer equal to or greater than 2) when the first communication and the second communication are synchronously performed. Alternatively, the execution cycles T1 and T2 of the first communication and second communication may be set to satisfy a relation of T1<T2 when the first communication and the second communication are asynchronously performed.

The processor 24 of the wearable device 20 uses the corrected state quantity to calculate the instruction position on the virtual space 50. When the processor 24 acquires the first data including the relative state quantity, the processor 24 uses the relative state quantity as it is, to calculate the instruction position. On the other hand, when the processor 24 acquires the first data including the pair of first state quantity and second state quantity, the processor 24 calculates the instruction position by using the relative state quantity in which the second state quantity is subtracted from the first state quantity.

In this way, the input system 10 according to the embodiment includes the stylus 30, the tablet 40 that detects the instruction position of the stylus 30, and one or a plurality of processors 24. The stylus 30 and the tablet 40 can communicate with each other. The stylus 30 can measure the first state quantity indicating the state of the apparatus or the time variation of the state. The tablet 40 can measure the second state quantity indicating the state of the apparatus or the time variation of the state. The stylus 30 uses the second communication to receive the second data including the second state quantity from the tablet 40 and uses the first communication to transmit, to the processor 24, the first data in which the first state quantity and the second state quantity are integrated.

The integration may be calculation of the relative state quantity by subtracting the second state quantity from the first state quantity or may be linkage of the first state quantity and the second state quantity. In addition, the second communication may be communication (for example, relay communication) that is not performed with the processor 24 and uses means different from that of the first communication. In addition, the execution frequency of the second communication may be lower than the execution frequency of the first communication.

[Modifications]

Note that the present disclosure is not limited to the specific examples described above. That is, those skilled in the art can appropriately design and change the specific examples, and the changed examples are included in the scope of the present disclosure as long as the changed examples have the features of the present disclosure. In addition, the elements included in the embodiment and modifications described later can be combined if technically possible, and the combinations are also included in the scope of the present disclosure as long as the combinations have the features of the present disclosure.

Although the wearable device 20 uses the virtual reality (VR) technique to display the virtual reality space in the example described in the embodiment, the augmented reality (AR) technique or the mixed reality (MR) technique may be used to display the image of the space, instead of using the virtual reality (VR) technique. For example, in the case of the AR technique, various types of information regarding the objects in the real space can be acquired, and then the area definition table illustrated in FIG. 4 can be created in advance.

Although the processor 24 is triggered by the pen-down operation to set the instruction target area 74 in the embodiment, the processor 24 may be triggered by other operations, such as an operation of a side switch included in the stylus 30. Further, although the processor 24 is triggered by the pen-down operation and the pen-up operation to control the display by switching the point of view of the virtual space 50 in the embodiment, the processor 24 may control the display without switching the point of view instead.

What is claimed is:

1. A wearable device operable using an instruction device and a detection device, the wearable device comprising:
   a processor; and
   a memory storing instructions which, when executed by the processor, cause the wearable device to:
   calculate an instruction position based on data transmitted from the instruction device, wherein the data includes a pair of (i) a first state quantity indicating a state of the instruction device or a time change in the state of the instruction device, and (ii) a second state quantity indicating a state of the detection device or a time change of the state of the detection device;
   calculate a plurality of relative state quantities from a plurality of first state quantities indicating a plurality of states of the instruction device or a plurality of time changes in the states of the instruction device and a plurality of second state quantities indicating a plurality of states of the detection device or a time change of the states of the detection device; and
   convert each of the relative state quantities according to a predetermined conversion rule; and
   calculate the instruction position in a virtual space by sequentially adding arithmetically the relative state quantities after each of the relative state quantities is converted.

2. The wearable device according to claim 1, wherein the predetermined conversion rule uses an affine matrix.

3. The wearable device according to claim 2, wherein the affine matrix is stored in association with objects or object surfaces.

4. The wearable device according to claim 2, wherein the affine matrix is calculated every time a target area is set.

5. A wearable device operable using an instruction device and a detection device, the wearable device comprising:
- a processor; and
- a memory storing instructions which, when executed by the processor, cause the wearable device to:
  - calculate an instruction position based on data transmitted from the instruction device, wherein the data includes a relative state quantity obtained based on a first state quantity and a second state quantity,
  - calculate a plurality of relative state quantities from a plurality of first state quantities indicating a plurality of states of the instruction device or a plurality of time changes in the states of the instruction device and a plurality of second state quantities indicating a plurality of states of the detection device or a time change of the states of the detection device; and
  - convert each of the relative state quantities according to a predetermined conversion rule; and
  - calculate the instruction position in a virtual space by sequentially adding arithmetically the relative state quantities after each of the relative state quantities is converted.

6. The wearable device according to claim 5, wherein the predetermined conversion rule uses an affine matrix.

7. An input system comprising:
- an instruction device;
- a detection device which, in operation, detects an instruction position of the instruction device; and
- a wearable device provided separately from the detection device, wherein the wearable device includes:
  - a display device which, in operation, displays an image of a virtual space;
  - a processor; and
  - a memory storing instructions which, when executed by the processor, cause the wearable device to:
    - calculate an instruction position based on (i) a first state quantity indicating a state of the instruction device or a time change in the state of the instruction device, and (ii) a second state quantity indicating a state of the detection device or a time change of the state of the detection device,
    - calculate a plurality of relative state quantities from a plurality of first state quantities indicating a plurality of states of the instruction device or a plurality of time changes in the states of the instruction device and a plurality of second state quantities indicating a plurality of states of the detection device or a time change of the states of the detection device; and
    - convert each of the relative state quantities according to a predetermined conversion rule; and
    - calculate the instruction position in a virtual space by sequentially adding arithmetically the relative state quantities after each of the relative state quantities is converted.

8. The input system according to claim 7, wherein the instruction device, in operation, transmits a pair of the first state quantity and the second state quantity.

9. The input system according to claim 7, wherein the instruction device, in operation, transmits a relative state quantity calculated from the first state quantity and the second state quantity.

10. The input system according to claim 7, wherein the predetermined conversion rule uses an affine matrix.

11. The input system according to claim 10, wherein the affine matrix is stored in association with objects or object surfaces.

12. The input system according to claim 10, wherein the affine matrix is calculated every time a target area is set.

\* \* \* \* \*